US006872045B1

(12) United States Patent
Weaver et al.

(10) Patent No.: US 6,872,045 B1
(45) Date of Patent: Mar. 29, 2005

(54) APPARATUS AND METHOD FOR FLUID DRIVE CONVERSION

(76) Inventors: David Eugene Weaver, P.O. Box 179, Lookout, WV (US) 25868; Richard E. Nash, 1809 Virginia Rd., Winston Salem, NC (US) 27104; James W. Blake, HC82 Box 105A, Rainelle, WV (US) 25962

(*) Notice: Subject to any disclaimer, the term of this patent is extended or adjusted under 35 U.S.C. 154(b) by 107 days.

(21) Appl. No.: 10/345,571

(22) Filed: Jan. 15, 2003

Related U.S. Application Data (60) Provisional application No. 60/348,269, filed on Jan. 15, 2002.

(51) Int. Cl.[7] ............................................. F03B 15/06
(52) U.S. Cl. ....................... 415/4.2; 415/4.4; 416/111; 416/119; 416/132 B; 416/169 R; 416/153
(58) Field of Search ................................ 416/111, 119, 416/118, 140, 132 B, 153, 169 R, 170 R, DIG. 4; 415/4.2, 4.4; 290/43, 44, 54, 55

(56) References Cited

U.S. PATENT DOCUMENTS

| | | | |
|---|---|---|---|
| 226,357 A | * 4/1880 | Saccone | 416/119 |
| 4,197,055 A | 4/1980 | Campbell | 416/119 |
| 4,609,827 A | * 9/1986 | Nepple | 290/44 |
| 5,332,925 A | 7/1994 | Thomas | 290/44 |
| 6,537,018 B2 | * 3/2003 | Streetman | 415/3.1 |

* cited by examiner

Primary Examiner—Edward K. Look
Assistant Examiner—Dwayne J White
(74) Attorney, Agent, or Firm—Steptoe & Johnson PLLC (57) ABSTRACT

A fluid drive conversion system having a plurality of flat foils rotatably connected to a vertical shaft such that the foils are generally vertical in position, pivot about a vertical axis, are a predefined distance, at least about one quarter of the width of a foil, from the vertical shaft thereby creating a central space. In operation, fluid flows through the central space and simultaneously pushes the back side of at least one foil while pushing the front side of one or more remaining foils, resulting in all of the foils rotating about the vertical shaft and contributing to the generation of usable energy. A wing is pivotally connected to the distal end of each radial arm and a bottom radial arm wherein each wing is in a general vertical orientation. The fluid drive conversion system employs either a conventional gear system, a conventional pulley system, or an electrical generation assembly using magnets, coils, and a means for harnessing an electrical current.

36 Claims, 5 Drawing Sheets

APPARATUS AND METHOD FOR FLUID DRIVE CONVERSION

CROSS-REFERENCE TO RELATED APPLICATIONS

This application claims the benefit of U.S. Application No. 60/348,269, filed Jan. 15, 2002.

BACKGROUND OF THE INVENTION

1. Field of the Invention

This invention relates to fluid drive conversion systems, and in particular, to a vertical axis windmill having a central space for maximizing the performance of the rotation of the foils, thereby enabling the system to generate multiple forms of usable energy.

2. Related Art

Windmills have been designed and constructed for ages as a means for harnessing the wind and converting that wind to power and other usable energy. While most windmills are horizontally arranged, certain windmills have a vertical arrangement of the sails, or foils. The advantage of the vertical windmill is that it eliminates any large height requirement and the need for a "tail." However, there is a continual need to improve the vertical windmill design and improve its performance while at the same time simplifying its design.

In U.S. Pat. No. 4,197,055, titled "Vertical Axis Windmill" and issued to Campbell, a vertical axis windmill is disclosed having a plurality of sails connected to a vertical shaft such that the vertical pivot axis of each said sail is not centered along the width of the sail, but rather is optimally located approximately ⅓ the sail width from its vertical leading edge. See Campbell, FIGS. 1 and 4; Col. 3, Lines 13–26. In addition to the offset pivot point, the interior edge of each foil is in close proximity to the vertical shaft. See Campbell, FIGS. 1 and 4; Col. 3, Lines 41–44. Although the Campbell patent suggests that the windmill can be used to provide power for different types of work, the patent is void of any disclosure as to how the windmill generates such power. The patent only discloses that the windmill can be used to drive an alternator comprising a field coil and an amature. See Campbell, Col. 5, Lines 21–26. Most importantly, the Campbell windmill is limited, as most conventional vertical windmills, in that not all of the sails are contributing to rotating the sails and the vertical shaft at all times through one complete revolution. That is, during operation of the Campbell windmill, there is always at least one sail, an "inactive" sail, that is not contributing to the rotation of the sails and the turning of the vertical shaft. The inactive sail is typically that sail which is downwind from the direction of the wind and is "blocked" from the wind by the remaining sails. This inactive sail does not contribute to the generation of energy because of the lack of a central space between the vertical shaft and the interior edges of the sails. Without a central space, wind cannot move through the windmill to push the inactive sail from behind, thereby causing the inactive sail to not contribute to the rotation of the sails and the turning of the vertical shaft.

In U.S. Pat. No. 5,332,925, titled "Vertical Windmill With Omnidirectional Diffusion" and issued to Thomas, a vertical windmill is disclosed having multiple layers of aerodynamic stators and airfoils connected to a vertical shaft. The stators are designed such that they rotate out of the wind to reduce the destructive tendencies in high winds, and a motor and centrifugal force are used to brake the system and provide better control in high winds. In addition, the Thomas windmill activates a generator only when the winds reach a minimum pre-set level, and then the windmill is used to enhance performance of the generator. The disadvantage with this vertical windmill is that it requires motors and generators to work, thereby increasing the complexity and operation of the system. The stators also are designed to rotate out of the wind, thereby forgoing the maximum potential of the wind's energy. In addition, as with conventional vertical windmills and the Campbell windmill discussed above, the Thomas windmill also does not provide a system wherein each stator is productive throughout an entire revolution around the vertical shaft. There is always at least one "inactive" stator. The stators are designed to pivot into the wind and minimize the surface area of a stator exposed to the wind, thereby preventing the wind from pushing a stator from the back and preventing such a stator from contributing to the rotation of the vertical shaft and to the generation of usable energy.

Therefore, there is a need for a fluid drive conversion system using certain vertical windmill technology that efficiently and effectively harnesses a flow of fluid into usable energy. There is further a need for a fluid drive conversion system in which the pivotal movement of foils is restricted in order to improve performance. There is still further a need for a fluid drive conversion system wherein all sails, or foils, of the system contribute at all times to the rotation of the foils and the generation of usable energy.

SUMMARY OF THE INVENTION

The fluid drive conversion system of the present invention solves the problems associated with conventional vertical windmills by providing a system having a plurality of flat foils rotatably connected to a vertical shaft such that the foils are generally vertical in position and each foil is a predefined distance, at least about one quarter of the width of a foil, from the vertical shaft thereby creating a central space. In operation, fluid flows through the central space and simultaneously pushes the back side of at least one foil while pushing the front side of one or more remaining foils, resulting in all of the foils rotating about the vertical shaft and contributing to the generation of usable energy. The foils are also prohibited from pivoting more than about 35 degrees from a longitudinal axis along a radial arm connecting each foil to the vertical shaft. Optionally, a wing is pivotally connected to the distal end of each radial arm wherein each wing is in a general vertical orientation and is connected to a radial arm at an end point. Similar to the foils, the wings may only pivot within a range of 0 to about 110 degrees from the longitudinal axis along the radial arm.

The present invention also contains a means for converting the flow of fluid into usable energy. The different conversion means is either a conventional gear system, a conventional pulley system, or an electrical generation assembly for generating an electrical current. The electrical generation assembly is a foil support in communication with the foils such that the foil support rotates along with the foils around the vertical shaft, a plurality of magnets positioned on the foil support, one or more coils, and a means for harnessing the electrical current generated by the magnets and coils.

The principal advantages of the present invention is that it is a very simple design mechanically that generates usable energy from either air, water, natural gas, petroleum, or another fluid source under even the most minimal conditions.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 1:
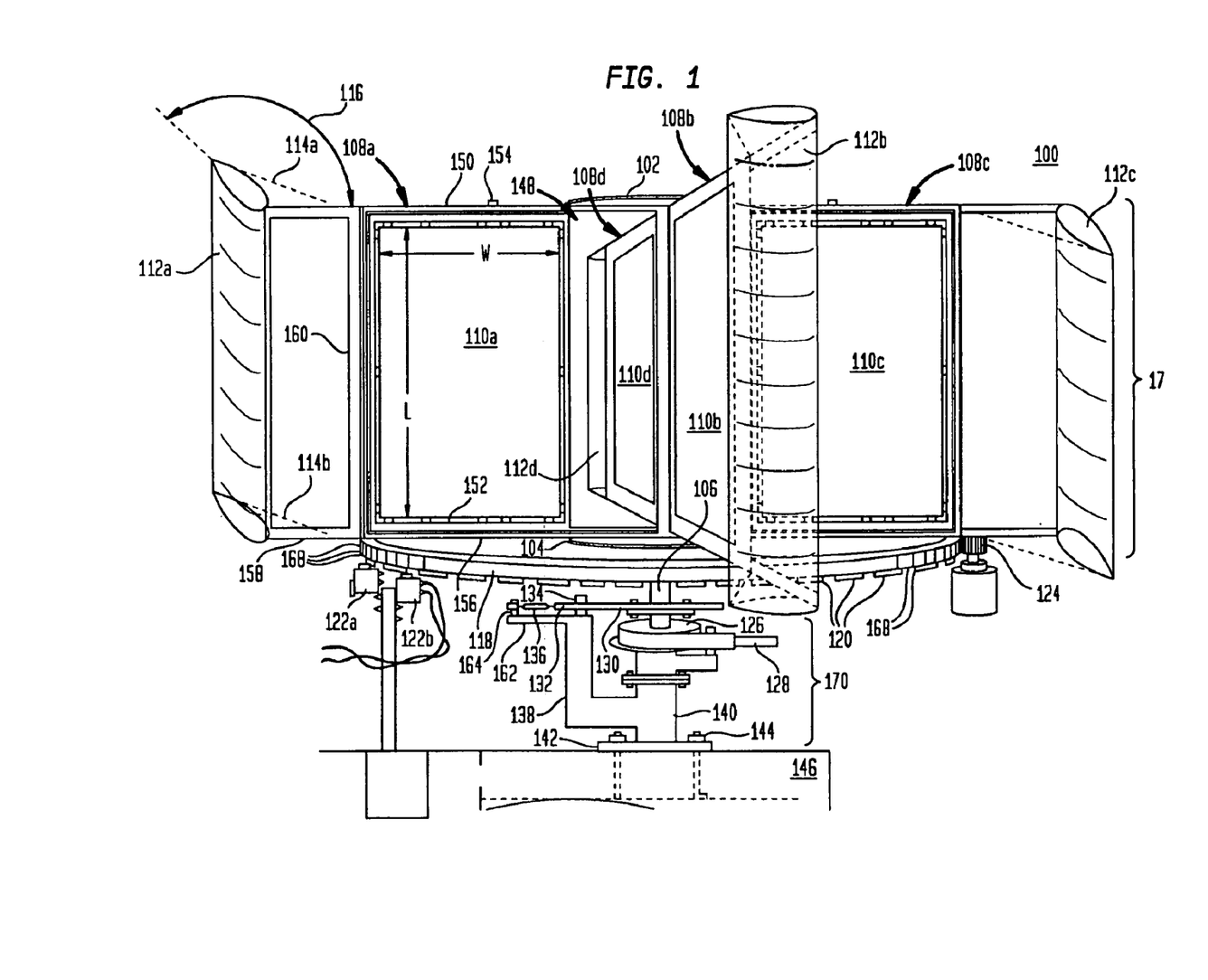
FIG. 1 is a perspective diagram showing a fluid drive conversion system of the present invention.
Figure 2:
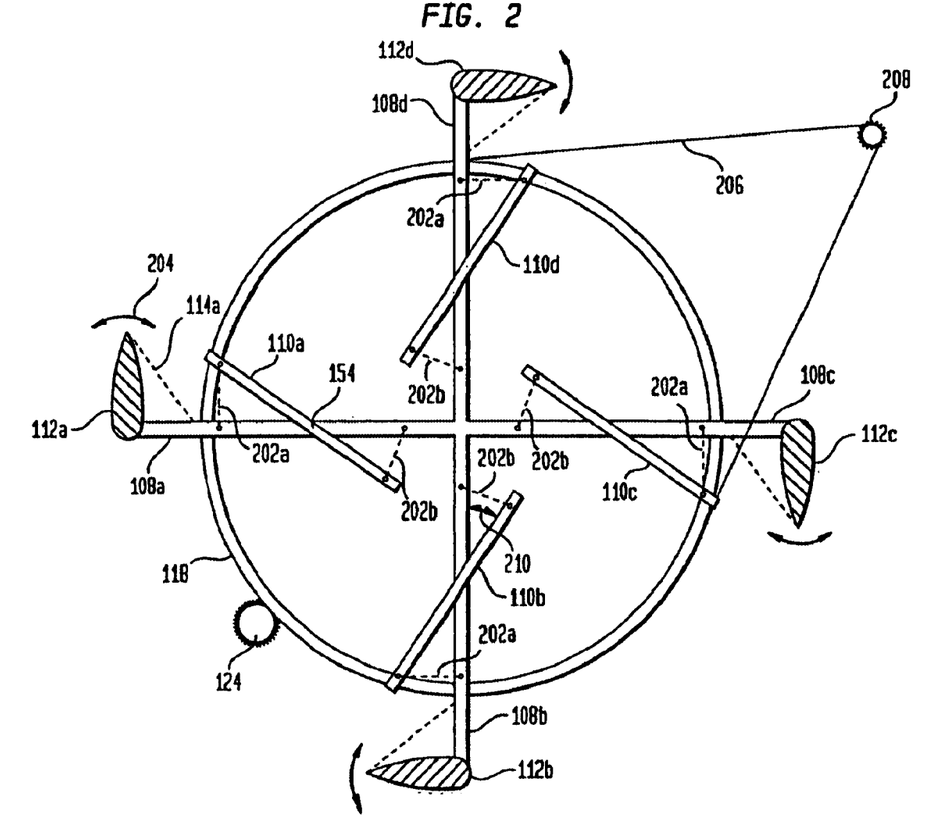
FIG. 2 is a top view of the fluid conversion system.
Figure 3:
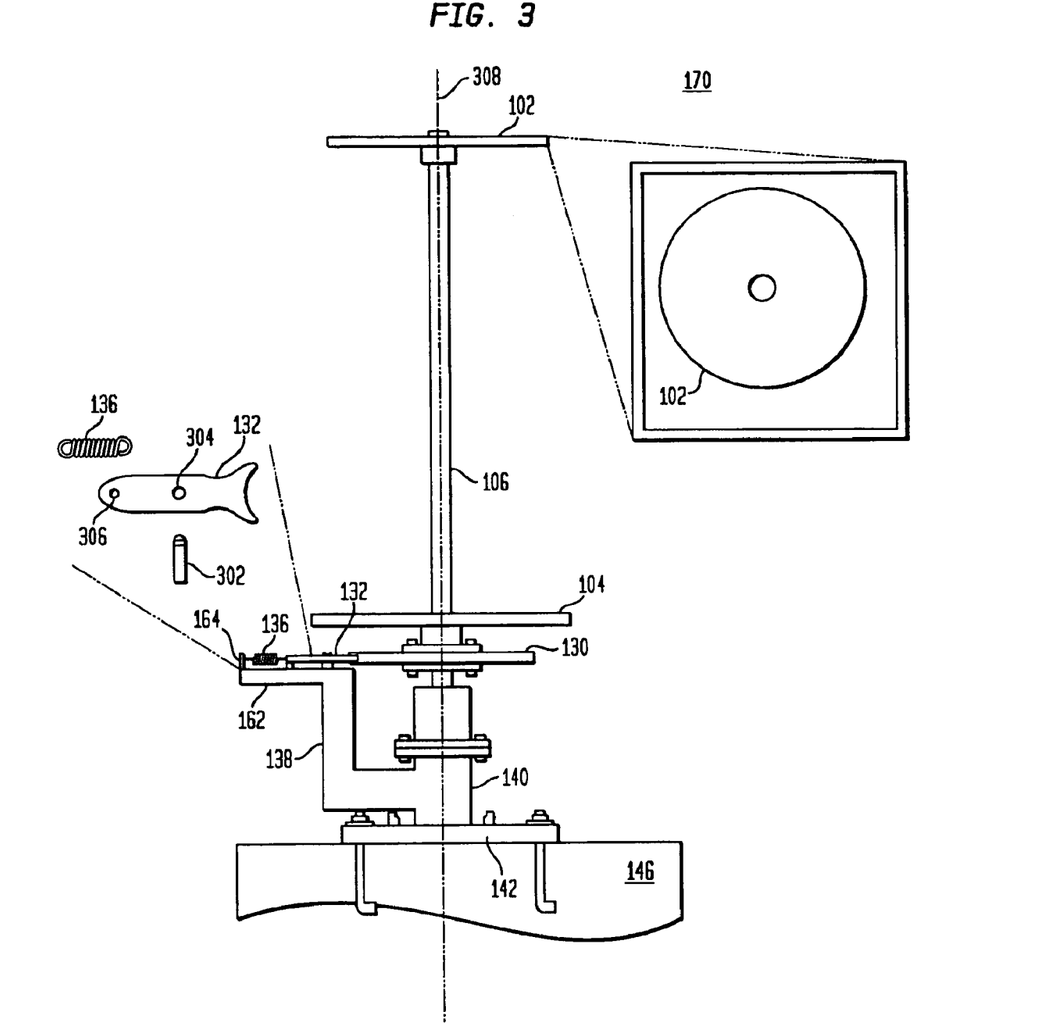
FIG. 3 is a planar side view of a braking system of the present invention.
Figure 4:
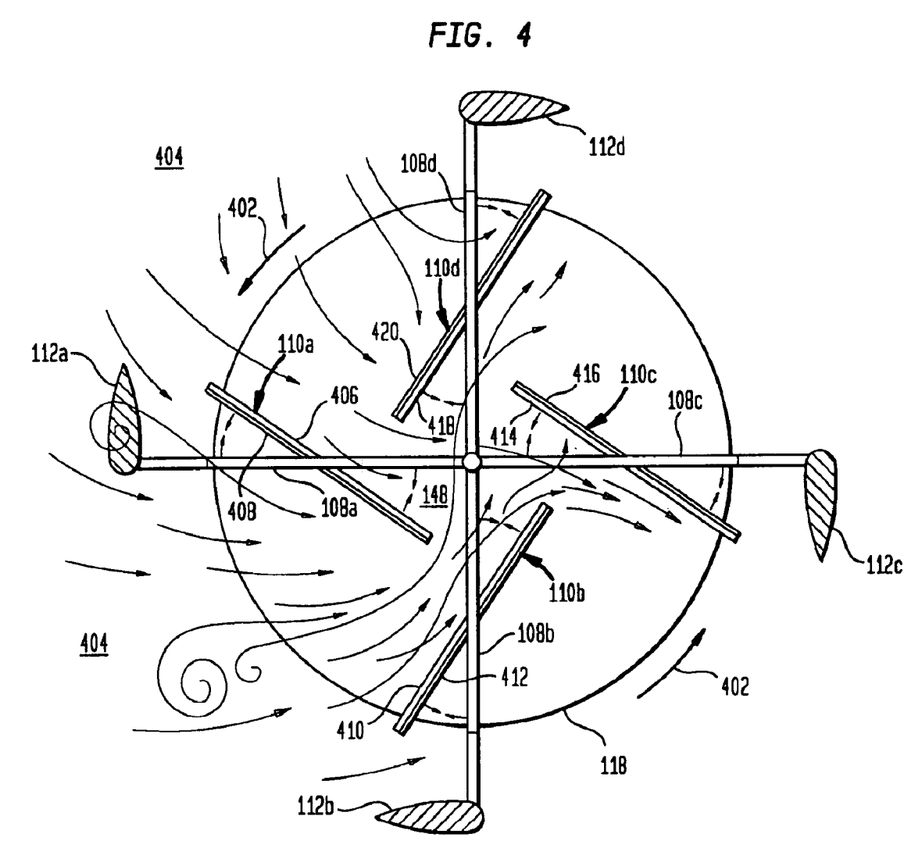
FIG. 4 is a planar top view of the fluid conversion system showing the effect of a flow of fluid on the foils.
Figure 5:
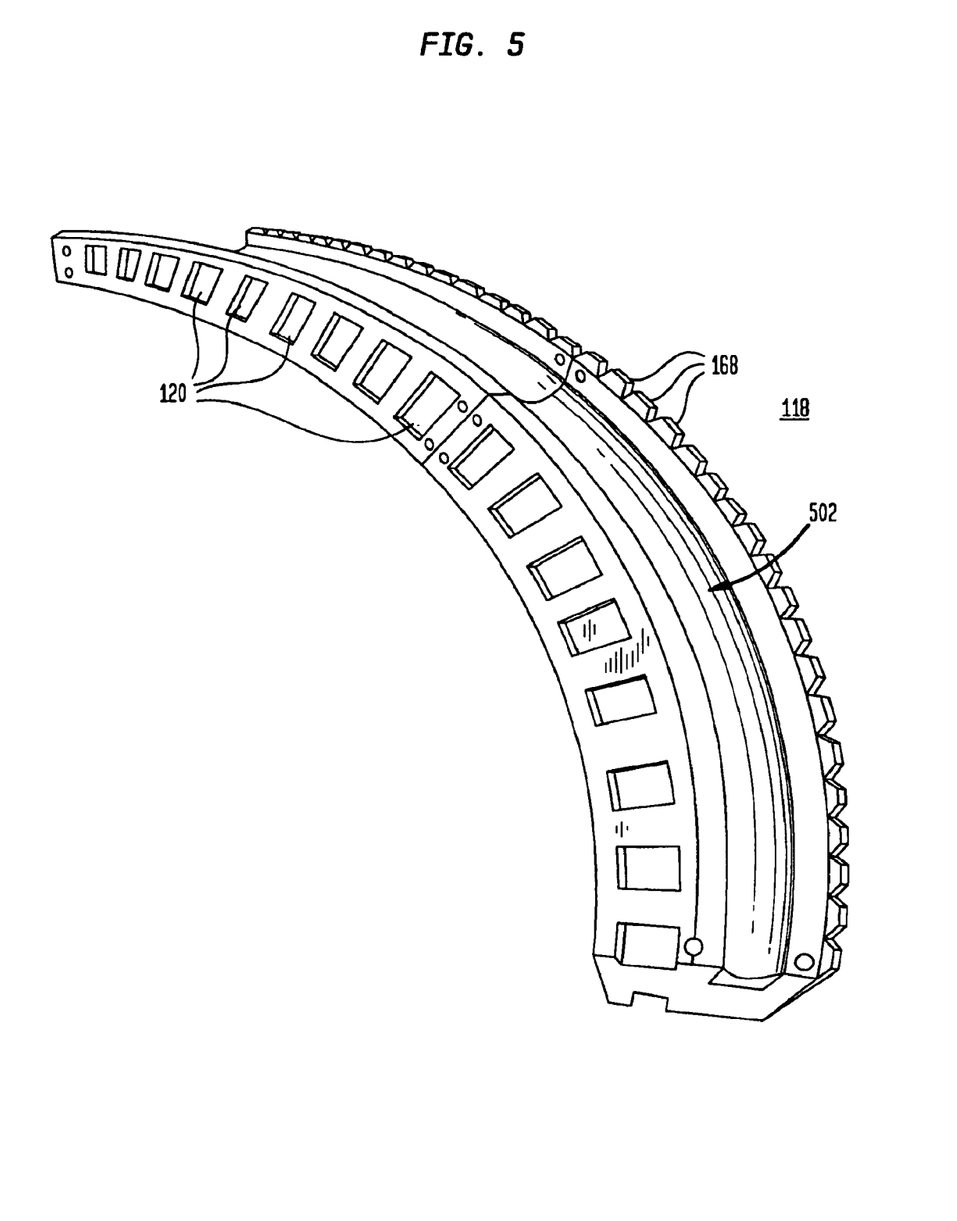
FIG. 5 is a perspective diagram showing the position of magnets on a foil support used to generate a usable electrical current.

The preferred embodiment of the fluid drive conversion system 100 of the present invention is shown in FIGS. 1–5. The preferred conversion system fluid drive 100 has a base assembly 170 which is used both to support and to regulate the rotation of the foil assembly 172. The base assembly 170 has a vertical shaft 106 extending upward from the base assembly 170 and along a vertical central axis 308, wherein the vertical shaft 106 rotates about the longitudinal axis 308 of the base assembly 170. A plurality of foils 110a–d are connected to the vertical shaft 106 such that foils 110a–d rotate about the longitudinal axis 308 of the base assembly 170 upon contact with a flow of fluid 404. In the preferred embodiment, each foil 110a–d is a flat panel having any polygonal shape, e.g., rectangular or triangular, or curved, e.g., round, circular, or elliptical, shape, or any combination thereof, and having a top side, a bottom side, an exterior side positioned farthest from the vertical shaft 106, an interior side positioned closest to the vertical shaft 106, a front side 406, 410, 414, 418, a back side 408, 412, 416, 420, a length L, and a width W. It should be noted that the figures show the preferred embodiment with four foils 110a–d, but this is for convenience purposes only. The fluid drive conversion system 100 of the present invention can be designed and manufactured using a different number of foils 110a–d.

Optionally, there is a top plate 102 and a bottom plate 104, both preferably circular in shape, secured to the vertical shaft 106 with the foils 110a–b sandwiched between. The top plate 102 and bottom plate 104 are used to provide stability and strength to the fluid drive conversion system 100 as the foils 110a–d rotate.

In one embodiment, the fluid drive conversion system 100 is intended to be anchored to the ground in an open space so that it can catch the wind and generate usable energy. An anchoring system may be used such as a support base 146, e.g., a concrete block sunken in the ground, having a vertical support 140 secured thereto with a support plate 142 and one or more bolts 144. This anchoring system ensures that the fluid drive conversion system 100 cannot be blown away in high winds.

Each foil 110a–d is connected to the vertical shaft 106 by a foil frame 108a–d wherein a foil, e.g., foil 110a, is contained by a frame, e.g., frame 108a, having a shape that corresponds to the shape of the foil 110a. The foil frame 108a–d holding each foil 110a–d provides support to the foil 110a–d during contact with the flow of fluid 404. The following discussion relates how a single foil 110a is connected within a foil frame 108a, but the discussion is applicable to any foil 110a–d. Regarding foil 110a, the top of the foil frame 108a is radial arm 150 that extends horizontally from the top end of the vertical shaft 106. The foil 110a is pivotally connected to the foil frame 108a such that the foil 110a is generally vertical in position in relation to the vertical shaft 106 such that the interior side of the foil 110a is a predefined distance, at least one quarter of the width W of the foil 110a, from the vertical shaft 106, thereby creating a central space 148 about the vertical shaft 106 and between the foils 110a–d. The use of a predefined distance of one quarter of the width W of the foil 110a is for convenience purpose only. The predefined distance is calculated according to the number of foils 110a–d and the strength requirements. In another embodiment, the predefined length has a maximum length of about one third the width W of the foil 110a.

The foil 110a is pivotally connected to the foil frame 108a at a top pivot connection 154 and a bottom pivot connection 156. These pivot connections 154, 156 are centrally located along the width W of the foil 110a and enable the foil 110a to pivot in relation to a horizontal, longitudinal axis along the radial arm 150.

The preferred embodiment also has a means for preventing the foils 110a–d from pivoting too far. For example, regarding foil 110a, a first means 202a connects the exterior side of the foil 110a (such as the distal end of the top side of the foil 110a) to the foil frame 108a and a second means 202b connects the interior side of the foil 110a (such as the near end of the bottom side of the foil 110a) to the foil frame 108a. Possible means for preventing 202a–b the foils 110a–d from pivoting too far include bungee cords, tethers, springs, and chains, which are secured using conventional means. In addition, the preferred means 202a–b prevents each foil 110a–d from pivoting more than about 35 degrees from the horizontal, angle 210, longitudinal axis along the radial arm 150, and prevents each foil 110a–d from pivoting across the horizontal, longitudinal axis along the radial arm 150.

Also in the preferred embodiment, the foils 110a–d are positioned about the vertical shaft 106 such that the fluid 404 flows through the central space 148 and simultaneously pushes the back side 408, 412, 416, 420 of at least one foil 110a–d while pushing the front side 406, 410, 414, 418 of the one or more remaining foils 110a–d. This action results in all of the foils 110a–d contributing to the rotation of the foils 110a–d and vertical shaft 106 and converting fluid energy, even the foil 110a–d moving into the wind 404 which is being pushed from behind by fluid flow 404 directed through the central space 148.

The fluid drive conversion system 100 of the present invention also incorporates a means for converting the flow of fluid 404 into usable energy. The present invention can be used with any type of fluid 404, e.g., air, water, natural gas, or petroleum, such that the fluid drive conversion system 100 can be used for pumping water, compressing air, or generating electricity or any other comparable type of energy. The means for converting the flow of fluid 404 into usable energy may be either a conventional gear system 124, a conventional pulley system (having a wheel 126 and belt 128), or an electrical generation assembly for generating an electrical current.

Regarding the electrical generation assembly, the foil assembly 172 contains a foil support 118, being circular in the preferred embodiment, connected to and positioned under the foils 110*a–d* such that the foil support 118 rotates in unison with the rotation of the foils 110*a–d*. In the preferred embodiment, the foil support 118 is about 12 feet in diameter and is made from high-density PVC tubing, aluminum, steel, or the like. A plurality of magnets 120 are positioned on the foil support 118 and are preferably embedded within the bottom surface of the foil support 118, but this is for convenience. It would be readily apparent to one of ordinary skill to attach the magnets 120 to the foil support 118 by another means.

The electrical generation assembly also includes one or more coils 122*a–b*, and a means for harnessing the electrical current generated by the coils 122*a–b*. The coils 122*a–b* are positioned such that they are in close proximity to the magnets 120 on the foil support 118. Therefore, upon rotation of the foils 110*a–b* by the flow of fluid 404, the foil support 118 rotates such that the magnets 120 rotate in relation to the coils 122*a–b*, thereby generating the electrical current in the coils 122*a–b*. It has been shown that with fifty small magnets 120 passing over about twelve fixed coils 122*a–b*, with a foil 110*a–d* and vertical shaft 106 rotation speed of ten rpms, the electrical generation assembly of the present invention generates about six thousand pulses per minute.

Regarding the conventional gear system 124, the foil support 118 has a notched edge 168 that is aligned with and engages the notched edge of the gear 124. Therefore, upon rotation of the foils 110*a–d* by the flow of fluid 404, the foil support 118 rotates, which in turn, rotates the gear 124. The gear 124 can then be used to drive anything needed, e.g., a pump, an engine, etc.

Regarding the conventional pulley system, the foil support 118 may have a notch or groove 502 along its exterior side surface through which a conventional V-belt or flat-belt 206 may run. Therefore, upon rotation of the foils 110*a–d* by the flow of fluid 404, the foil support 118 rotates, which in turn, rotates a belt 206 contained in the groove 502. The belt 206 then turns a conventional gear 208 which drives anything needed by the user.

In order to effectively generate usable energy, the fluid drive conversion system 100 has a brake system in communication with the base assembly 170 for enabling the foils 110*a–d* to rotate about the vertical shaft 106 in only one direction, which preferably is counter-clockwise 402. The brake system is preferably a main gear 130, having a notched edge, which rotates with the rotation of the vertical shaft 106. A conventional pall 132 and spring 136 are in communication with the notched edge of the main gear 130 such that the end of the pall 132 engages the individual notches of the main gear 130 as the main gear 130 rotates. The pall 132 and spring 136 are held in proper position by a support arm 138, a support platform 162, a flange 164, and a pin 302 through aperture 304 of the pall 132. In operation, when the main gear 130 stops rotating, the pall 132 and spring 136 holds the pall 132 within a specific notch of the main gear 130, thereby preventing the main gear 130 from rotating in an opposite direction, which in turn, prevents the vertical shaft 106 from rotating in an opposite direction. This brake system ensures that the fluid drive conversion system 100 will only rotate in a single direction.

To further increase the performance of the fluid drive conversion system 100 of the present invention, a wing 112*a–d* is attached to the distal end of each radial arm 150 and the distal end of a bottom radial arm 158. Each wing 112*a–d*, having a first end and a second end, is connected to the distal end of the radial arm 150 and bottom radial arm 158 such that the wing 112*a–d* hangs in a generally vertical position and that the wing 112*a–d* pivots, directional arrow 204, at its first end about a vertical axis. A vertical support bar 160 may be used to support the radial arm 150 and bottom radial arm 158 during rotation. The cross section of each wing 112*a–d* is designed to provide aerodynamic lift, e.g., being a tear-drop shape. In addition, each wing 112*a–d* pivots within a range of 0 to about 110 degrees, angle 116, from a longitudinal axis along the radial arm 150. Similar to the foils 110*a–d*, a first means 114*a* connects the first end of a top of a wing 112*a* to the top of the foil frame 108*a* and a second means 114*b* connects the first end of a bottom of a wing 112*a* to the bottom of the foil frame 108*a*. Possible means for preventing 114*a–b* the wings 112*a–d* from pivoting too far include bungee cords, tethers, springs, and chains, which are secured using conventional means.

As noted above, the fluid drive conversion system 100 of the present invention can be used in the open, such as in a field or in communication with a waterway, wherein the fluid 404 is air, water, natural gas, and/or petroleum. However, the present invention is not limited to being used in the open. The present fluid drive conversion system 100 can also be designed to fit within a closed space, such as, in a pipe, container, or culvert. For example, a fluid drive conversion system 100 of the present invention may be positioned within an exhaust pipe of a mine, a pipe used to transport natural gas from a natural gas well, or a drainage pipe, such that the fluid drive conversion system 100 has the appropriate size and shape of the closed space and is held in place by conventional fasteners. Therefore, when the fluid 404, e.g., air, natural gas, or water, flows through the fluid drive conversion system 100 as discussed above, it generates electricity in the same manner as also discussed above.

All dimensions and materials used in the preferred embodiment are for convenience purpose only. It would be readily apparent to one of ordinary skill in the relevant arts to design and build a fluid conversion system of the present invention using different dimensions and comparable materials.

CONCLUSION

While various embodiments of the present invention have been described above, it should be understood that they have been presented by the way of example only, and not limitation. It will be understood by those skilled in the art that various change in form and details may be made therein without departing from the spirit and scope of the invention as defined. Thus, the breadth and scope of the present invention should not be limited by any of the above-described exemplary embodiments.

What is claimed is:

1. A fluid drive conversion system for converting a flow of fluid into usable energy, comprising:

a base assembly;

a vertical shaft, having a top end and a bottom end, extending upward from said base assembly, said vertical shaft being rotatable about a longitudinal axis of said base assembly and said vertical shaft;

a plurality of foils, each said foil being a flat panel and having a top side, a bottom side, an exterior side, an interior side, a front side, a back side, a length, and a width;

a plurality of radial arms connected to the top end of said vertical shaft;

a means for pivotally connecting said plurality of foils to said plurality of arms such that said plurality of foils are generally vertical in position, each foil being pivotally connected to one radial arm such that the interior side of each said foil is a predefined distance, at least about one quarter of the width of one said foil, from said vertical shaft thereby creating a central space and each said foil pivots in relation to said one radial arm; and a means for converting the flow of fluid into usable energy;

a plurality of wings, wherein each of said plurality of wings has a first end and a second end and is secured to a distal end of one of said plurality of radial arms in generally a vertical position such that each of said plurality of wings pivots about a vertical axis at its first end and its second end pivots in a direction of the flow of fluid;

wherein said plurality of foils are positioned about said vertical shaft such that the fluid flows through said central space and simultaneously pushes the back side of at least one foil while pushing the front side of one or more remaining foils, resulting in all said plurality of foils rotating about the longitudinal axis of said base assembly, resulting in all said plurality of foils contributing to the conversion of the flow of fluid into usable energy.

2. The fluid drive conversion system according to claim 1, further comprising a means for prohibiting each of said plurality of foils from pivoting more than about 35 degrees from a longitudinal axis along one of said plurality of radial arms.

3. The fluid drive conversion system according to claim 2, wherein said means for prohibiting is selected from a group consisting of bungee cords, tethers, springs, and chains.

4. The fluid drive conversion system according to claim 2, wherein said means for prohibiting prevents each of said plurality of foils from pivoting across the longitudinal axis along one of said radial arms.

5. The fluid drive conversion system according to claim 2, wherein one or more said plurality of foils are fixed to one of said plurality of radial arms in a predefined orientation and a predefined angle from the longitudinal axis along one of said plurality of radial arms.

6. The fluid drive conversion system according to claim 1, wherein each said foil has a shape selected from a group consisting of rectangular, triangular, round, elliptical, polygonal, and any combination thereof.

7. The fluid drive conversion system according to claim 1, wherein the fluid is selected from the group consisting of air, water, natural gas, and petroleum.

8. The fluid drive conversion system according to claim 1, wherein said means for converting the flow of fluid into usable energy is selected from a group consisting of a gear system, a pulley system, and an electrical generation assembly for generating an electrical current.

9. The fluid drive conversion system according to claim 1, wherein said foils rotate in both a clockwise and counter-clockwise direction about the longitudinal axis of said base assembly and said vertical shaft.

10. The fluid drive conversion system according to claim 1, wherein each of said plurality of foils is secured to said vertical shaft by a frame assembly containing one radial arm.

11. The fluid drive conversion system according to claim 1, wherein each of said plurality of wings pivots within a range of 0 to about 110 degrees from a longitudinal axis along said radial arm.

12. The fluid drive conversion system according to claim 1, further comprising a closed space in which the fluid drive conversion system is positioned and through which the fluid flows such that the flow of fluid engages all of said plurality of foils and all of said plurality of foils contribute to the conversion of the flow of fluid into usable energy.

13. The fluid drive conversion system according to claim 12, wherein said closed space is selected from the group consisting of a container, pipe, and culvert.

14. A method for converting a flow of fluid into usable energy, comprising the steps of:

(a) assembling a fluid drive conversion system by pivotally connecting a plurality of foils, each said foil having a top side, a bottom side, an exterior side, an interior side, a front side, a back side, a length, and a width to a plurality of radial arms connected to a top end of a vertical shaft, said vertical shaft, having a top end and a bottom end, extending upward from a base assembly, said vertical shaft being rotatable about a longitudinal axis of said base assembly, such that said plurality of foils are generally vertical in position, each foil being pivotally connected to one radial arm such that the interior side of each said foil is a predefined distance, at least about one quarter of the width of said foil, from said vertical shaft thereby creating a central space and each said foil pivots in relation to said one radial arm, wherein said plurality of foils are positioned about said vertical shaft such that the fluid flows through said central space and simultaneously pushes the back side of at least one foil while pushing the front side of one or more remaining foils, resulting in all said foils rotating about the longitudinal axis of said base assembly and said vertical shaft;

(b) flowing the fluid through the central space of said fluid drive conversion system;

(c) generating the usable energy from said foils rotating about the longitudinal axis of said base assembly and said vertical shaft such that all of said plurality of foils are converting fluid energy during a rotation around said vertical shaft; and (d) prohibiting one or more wings, each said wing having a first end and a second end and is secured to a distal end of one said radial arm in a generally vertical position such that each said wing pivots about a vertical axis at the first end of said foil and said second end of each said foil pivots in a direction of the flow of fluid, from pivoting more than about 110 degrees from a longitudinal axis along said radial arm.

15. The method according to claim 14, further comprising the step of:

(e) prohibiting each said foil from pivoting more than about 35 degrees from a longitudinal axis along said radial arm and prohibiting each said foil from pivoting across the longitudinal axis along said radial arm.

16. The method according to claim 14, further comprising the step of:

(e) braking said plurality of foils such that said plurality of foils rotate about said vertical shaft in only one direction.

17. The method according to claim 14, wherein said step (c) generates the usable energy with a means for converting the flow of fluid into usable energy selected from a group consisting of a gear system, a pulley system, and an electrical generation assembly for generating an electrical current.

18. The method according to claim 14, further comprising the step of:

(e) positioning said fluid drive conversion system in a closed space such that the flow of fluid through said closed space engages all of said plurality of foils and all of said plurality of foils contribute to the conversion of the flow of fluid into usable energy.

19. A fluid drive conversion system for converting a flow of fluid into usable energy, comprising:

a base assembly;

a vertical shaft, having a top end and a bottom end, extending upward from said base assembly, said vertical shaft being rotatable about a longitudinal axis of said base assembly and said vertical shaft;

a plurality of foils, each said foil being a flat panel and having a top side, a bottom side, an exterior side, an interior side, a front side, a back side, a length, and a width;

a plurality of radial arms connected to the top end of said vertical shaft;

a means for pivotally connecting said plurality of foils to said plurality of arms such that said plurality of foils are generally vertical in position, each foil being pivotally connected to one radial arm such that the interior side of each said foil is a predefined distance, at least about one quarter of the width of one said foil, from said vertical shaft thereby creating a central space and each said foil pivots in relation to said one radial arm;

a means for converting the flow of fluid into usable energy; and a brake system in communication with said base assembly for enabling said plurality of foils to rotate about said vertical shaft in only one direction;

wherein said plurality of foils are positioned about said vertical shaft such that the fluid flows through said central space and simultaneously pushes the back side of at least one foil while pushing the front side of one or more remaining foils, resulting in all said plurality of foils rotating about the longitudinal axis of said base assembly, resulting in all said plurality of foils contributing to the conversion of the flow of fluid into usable energy.

20. The fluid drive conversion system according to claim 19, further comprising a means for prohibiting each of said plurality of foils from pivoting more than about 35 degrees from a longitudinal axis along one of said plurality of radial arms.

21. The fluid drive conversion system according to claim 20, wherein said means for prohibiting prevents each of said plurality of foils from pivoting across the longitudinal axis along one of said radial arms.

22. The fluid drive conversion system according to claim 20, wherein one or more said plurality of foils are fixed to one of said plurality of radial arms in a predefined orientation and a predefined angle from the longitudinal axis along one of said plurality of radial arms.

23. The fluid drive conversion system according to claim 19, wherein each said foil has a shape selected from a group consisting of rectangular, triangular, round, elliptical, polygonal, and any combination thereof.

24. The fluid drive conversion system according to claim 19, wherein the fluid is selected from the group consisting of air, water, natural gas, and petroleum.

25. The fluid drive conversion system according to claim 19, wherein said means for converting the flow of fluid into usable energy is selected from a group consisting of a gear system, a pulley system, and an electrical generation assembly for generating an electrical current.

26. The fluid drive conversion system according to claim 19, further comprising a closed space in which the fluid drive conversion system is positioned and through which the fluid flows such that the flow of fluid engages all of said plurality of foils and all of said plurality of foils contribute to the conversion of the flow of fluid into usable energy.

27. A fluid drive conversion system for converting a flow of fluid into usable energy, comprising:

a base assembly;

a vertical shaft, having a top end and a bottom end, extending upward from said base assembly, said vertical shaft being rotatable about a longitudinal axis of said base assembly and said vertical shaft;

a plurality of foils, each said foil being a flat panel and having a top side, a bottom side, an exterior side, an interior side, a front side, a back side, a length, and a width;

a plurality of radial arms connected to the top end of said vertical shaft;

a means for pivotally connecting said plurality of foils to said plurality of arms such that said plurality of foils are generally vertical in position, each foil being pivotally connected to one radial arm such that the interior side of each said foil is a predefined distance, at least about one quarter of the width of one said foil, from said vertical shaft thereby creating a central space and each said foil pivots in relation to said one radial arm; and a means for converting the flow of fluid into usable energy, wherein said means for converting the flow of fluid into usable energy is selected from a group consisting of a gear system, a pulley system, and an electrical generation assembly for generating an electrical current;

wherein said plurality of foils are positioned about said vertical shaft such that the fluid flows through said central space and simultaneously pushes the back side of at least one foil while pushing the front side of one or more remaining foils, resulting in all said plurality of foils rotating about the longitudinal axis of said base assembly, resulting in all said plurality of foils contributing to the conversion of the flow of fluid into usable energy, wherein said electrical generation assembly comprises a foil support in communication with said plurality of foils, a plurality of magnets positioned on said foil support, one or more coils, and a means for harnessing electrical current, said means for harnessing being in communication with said plurality of coils, such that rotation of said foils rotates said foil support and said plurality of magnets in relation to said plurality of coils, thereby generating the electrical current in said plurality of coils which is received by said means for harnessing.

28. The fluid drive conversion system according to claim 27, further comprising a means for prohibiting each of said plurality of foils from pivoting more than about 35 degrees from a longitudinal axis along one of said plurality of radial arms.

29. The fluid drive conversion system according to claim 28, wherein said means for prohibiting is selected from a group consisting of bungee cords, tethers, springs, and chains.

30. The conversion system fluid drive according to claim 28, wherein said means for prohibiting prevents each of said plurality of foils from pivoting across the longitudinal axis along one of said radial arms.

31. The fluid drive conversion system according to claim 28, wherein one or more said plurality of foils are fixed to one of said plurality of radial arms in a predefined orientation and a predefined angle from the longitudinal axis along one of said plurality of radial arms.

32. The fluid drive conversion system according to claim 27, wherein each said foil has a shape selected from a group consisting of rectangular, triangular, round, elliptical, polygonal, and any combination thereof.

33. The fluid drive conversion system according to claim 27, wherein the fluid is selected from the group consisting of air, water, natural gas, and petroleum.

34. The fluid drive conversion system according to claim 27, wherein said foils rotate in both a clockwise and counter-clockwise direction about the longitudinal axis of said base assembly and said vertical shaft.

35. The fluid drive conversion system according to claim 27, further comprising a closed space in which the fluid drive conversion system is positioned and through which the fluid flows such that the flow of fluid engages all of said plurality of foils and all of said plurality of foils contribute to the conversion of the flow of fluid into usable energy.

36. A method for converting a flow of fluid into usable energy, comprising the steps of:

(a) assembling a fluid drive conversion system by pivotally connecting a plurality of foils, each said foil having a top side, a bottom side, an exterior side, an interior side, a front side, a back side, a length, and a width to a plurality of radial arms connected to a top end of a vertical shaft, said vertical shaft, having a top end and a bottom end, extending upward from a base assembly, said vertical shaft being rotatable about a longitudinal axis of said base assembly, such that said plurality of foils are generally vertical in position, each foil being pivotally connected to one radial arm such that the interior side of each said foil is a predefined distance, at least about one quarter of the width of said foil, from said vertical shaft thereby creating a central space and each said foil pivots in relation to said one radial arm, wherein said plurality of foils are positioned about said vertical shaft such that the fluid flows through said central space and simultaneously pushes the back side of at least one foil while pushing the front side of one or more remaining foils, resulting in all said foils rotating about the longitudinal axis of said base assembly and said vertical shaft;

(b) flowing the fluid through the central space of said fluid drive conversion system; and (c) generating the usable energy from said foils rotating about the longitudinal axis of said base assembly and said vertical shaft such that all of said plurality of foils are converting fluid energy during a rotation around said vertical shaft, wherein said step (c) generates the usable energy with a means for converting the flow of fluid into usable energy selected from a group consisting of a gear system, a pulley system, and an electrical generation assembly for generating an electrical current, wherein said electrical generation assembly comprises a foil support in communication with said plurality of foils, a plurality of magnets positioned on said foil support, one or more coils, and a means for harnessing electrical current, said means for harnessing being in communication with said plurality of coils, such that rotation of said foils rotates said foil support and said plurality of magnets in relation to said plurality of coils, thereby generating the electrical current in said plurality of coils which is received and stored by said means for harnessing.

* * * * *